L. VIEZZI.
WINDOW SEAT.
APPLICATION FILED JULY 7, 1919.
1,353,681. Patented Sept. 21, 1920.
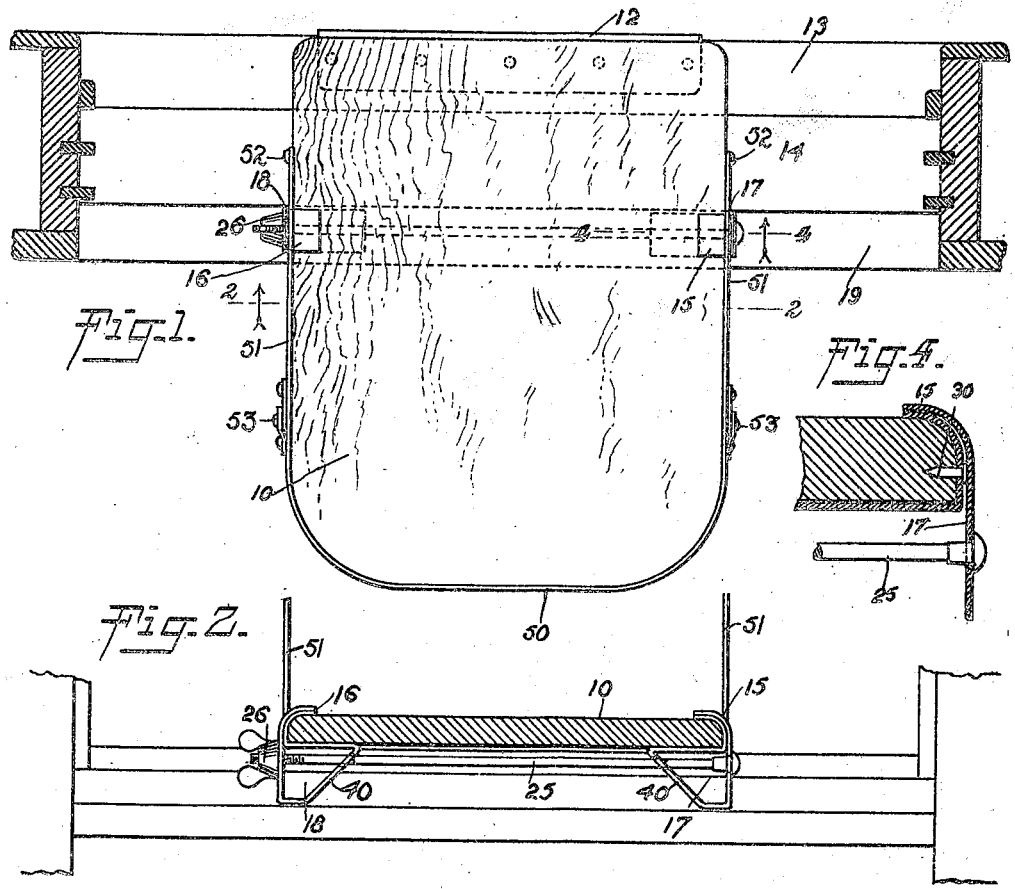
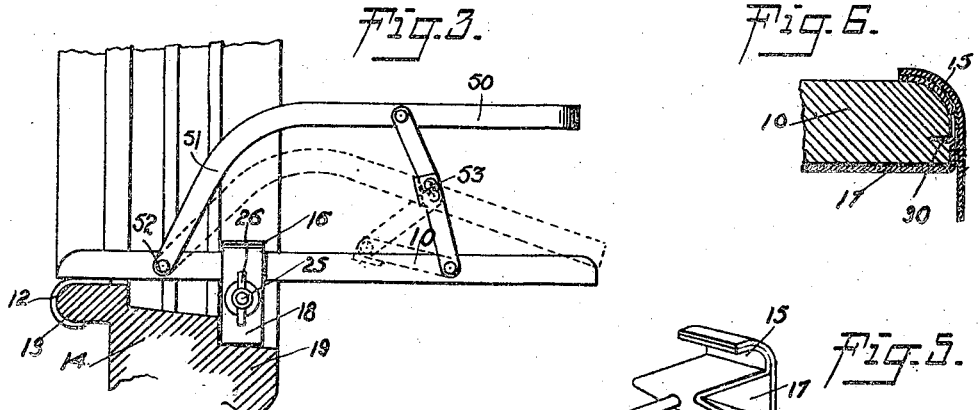
WITNESSES
INVENTOR
LUIGI VIEZZI
BY
ATTORNEYS

UNITED STATES PATENT OFFICE.

LUIGI VIEZZI, OF WEST NEW YORK, NEW JERSEY.

WINDOW-SEAT.

1,353,681.  Specification of Letters Patent.  Patented Sept. 21, 1920.

Application filed July 7, 1919. Serial No. 308,972.

*To all whom it may concern:*

Be it known that I, LUIGI VIEZZI, a citizen of the United States, and a resident of West New York, in the county of Hudson and State of New Jersey, have invented a new and Improved Window-Seat, of which the following is a full, clear, and exact description.

The object of the invention is to provide a new and improved window seat for accommodating a person employed for washing a window, hanging up wash or doing other work, and arranged to permit of conveniently and quickly attaching the seat to the window sill and projecting the seat sufficiently far out to enable the occupant to readily wash the outside of the window or do other work without danger of losing their balance and falling out of the window. Another object is to permit of readily adjusting the window seat to fit windows of different shapes and sizes.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the window seat as applied and with the sides of the window casing shown in section;

Fig. 2 is a sectional elevation of the same on the line 2—2 of Fig. 1;

Fig. 3 is a side elevation of the window seat in position on the window, the sill of which is shown in section;

Fig. 4 is an enlarged sectional side elevation of a portion of the seat or platform with one of the rests attached thereto;

Fig. 5 is a perspective view of the adjustable rests; and

Fig. 6 is an enlarged transverse section of a modified form of one of the rests.

The platform or seat 10 is provided at the under side of its forward edge with a hook 12 adapted to hook on to the stool 13 of the window sill 14 to hold the platform against outward and upward tilting movement. The sides of the platform 10 are engaged by the guideways 15, 16 formed on rests 17, 18 adapted to rest on the subsill 19 and adapted to abut against the outer edge of the sill 14, as plainly indicated in the drawings. The rests 17 and 18 are connected with each other by a bolt 25 preferably attached to the rest 17 and extending through the rest 18, the bolt being provided with a wing nut 26 abutting against the outer face of the rest 18 to permit the user to readily screw up the wing nut to firmly engage the guideways 15, 16 of the rests 17, 18 with the sides of the platform 10. When the wing nut 26 is loosened on the bolt 25 then the rests 17 and 18 can be readily moved along the side edges of the platform 10 until the rests abut against the outer edge of the sill 14, and when this position has been reached the wing nut 26 is screwed up securely to clamp the rests 17, 18 in position on the platform 10. It will be noticed that by this arrangement the rests can be readily adjusted on the platform 10 to fit window sills 14 of different depth. In order to prevent the rests 17 and 18 form accidental movement on the platform 10 use is preferably made of a fastening point or prong 30 held on the corresponding guideway 15 or 16 and adapted to pass into the corresponding edge of the platform 10 on screwing up the wing nut 26 of the bolt 25 (see Figs. 4 and 6). The prong 30 may be a separate member attached to the corresponding guideway 15 or 16 (see Fig. 4) or it may be struck up from the material of which the guideway is made, as shown in Fig. 6.

Each of the rests 17 and 18 is preferably made of a single piece of sheet metal bent to form the guideway 15 or 16 and a brace 40 to give the desired strength to the rest.

The platform or seat 10 is provided at the sides and back with a railing, preferably formed of a U-shaped member 50 provided with downwardly and rearwardly extending arms 51 pivotally connected at 52 to the sides of the platform 10 near the inner end thereof. The railing member 50 is connected by articulated or knuckle-joint braces 53 with the sides of the platform 10 to allow of folding the railing as indicated in dotted lines in Fig. 3. When the railing is in this folded position, the platform can be readily used for supporting a basket filled with clothes to be hung on a wash line, it being understood that in this case the platform 10 is arranged near the side of the window adjacent the wash line, and the seat prevents the clothes from coming in contact with the corresponding side of the window or with the window sill or wall of the building to prevent soiling of the clothes. The railing when in folded position permits of conveniently storing the window seat in a comparatively small space. It is understood that by the arrangement described, the railing when in extended position forms a guard for a person sitting on the platform, and when in folded position it forms a guard for the clothes to be hung on a wash line.

From the foregoing it will be seen that by the arrangement described the window seat can be readily and quickly placed in position on the window sill and the window seat is adapted to readily accommodate a person employed for washing windows, hanging up wash or doing other work. It will further be seen that by the use of the adjustable rests 17 and 18 the window seat can be readily fitted to windows of different construction.

Having thus described my invention, I claim as new and desire to secure by Letters Patent:—

1. A window seat, comprising a platform provided at its forward end with a hook adapted to hook onto the front edge of the window sill, two rests provided with guideways slidably engaging the sides of the platform and adapted to abut against the outer edge of the sill and to rest on the subsill, and a bolt having a nut at one end and connecting the said rests with each other, said bolt forming the only connection between the rests and serving to adjustably secure said rests on the platform.

2. A window seat, comprising a platform provided at its forward end with a hook adapted to hook onto the front edge of the window sill, rests each made of a piece of sheet metal bent to form a guideway and an inwardly extending brace, the guideway engaging the corresponding side of the platform, a bolt having a nut at one end and connecting the said rests with each other, and prongs on the said guideways and adapted to engage the sides of the platform when the rests are clamped on the platform by the bolt.

3. A window rest, comprising a platform provided at its forward end with a hook adapted to hook onto the front edge of a window sill, rests adjustably mounted on the said platform and adapted to abut against the outer edge of the sill and to rest on a subsill, a U-shaped railing member having downwardly extending side arms pivoted on the sides of the platform, and knuckle-jointed braces connecting the railing member with the platform, the said railing member when in extended or in folded position forming a guard.

LUIGI VIEZZI.